United States Patent [19]

Moracchini

[11] Patent Number: 5,214,533
[45] Date of Patent: May 25, 1993

[54] PORTABLE MONOCULAR WITH HIGH MAGNIFICATION

[76] Inventor: Alexandre Moracchini, Querciolo, F 20213 Castellare, France

[21] Appl. No.: 795,555

[22] Filed: Nov. 21, 1991

Related U.S. Application Data

[63] Continuation-in-part of Ser. No. 391,596, Jul. 7, 1989, abandoned.

[30] Foreign Application Priority Data

Nov. 9, 1987 [FR] France ................. 87 15500

[51] Int. Cl.⁵ ............... G02B 23/00; G02B 7/02
[52] U.S. Cl. ................ 359/367; 359/504; 359/819
[58] Field of Search ........... 359/367, 368, 375–380, 359/399–412, 480, 481, 503–506, 642, 656, 661, 691, 793–795, 798–811, 819, 362–363, 432–435, 663, 827, 812–818

[56] References Cited

U.S. PATENT DOCUMENTS

| | | | |
|---|---|---|---|
| 2,644,383 | 7/1953 | Meditz | 359/369 |
| 3,119,185 | 1/1964 | Gray | 359/811 |
| 4,726,670 | 2/1988 | Sherrard | 359/504 |
| 4,807,985 | 2/1989 | Feinbloom | 359/425 |

FOREIGN PATENT DOCUMENTS 284487 11/1952 France ................. 359/432

*Primary Examiner*—Bruce Y. Arnold
*Assistant Examiner*—Thong Nguyen
*Attorney, Agent, or Firm*—William A. Drucker

[57] ABSTRACT

The portable monocular comprises an elongate body in two parts (2,3) at one end of which is fixed an eyepiece (1). At its other end the elongate body encloses two biconvex lenses (4,4') of equal power arranged in grooves (5,5'). The distance (A) between the first lens (4) and the second lens (4') is equal to half the focal distance of the first lens (4) and is less than or equal to a diameter of this first lens. The relationship between the distance A and the distance B separating the second biconvex lens (4') from the eyepiece (1) is such that $3A \leq B \leq 4A$.

4 Claims, 1 Drawing Sheet

PORTABLE MONOCULAR WITH HIGH MAGNIFICATION

This is a continuation-in-part application of my co-pending application Ser. No. 391,596 filed Jul. 7, 1989 now abandoned.

BACKGROUND OF THE INVENTION

1. Field Of The Invention.

The present invention relates to a portable monocular device which, by providing high magnification, is designed for close-up observation.

2. Summary Of The Invention

The portable monocular device of the invention which forms a light and readily transportable optical instrument, is endowed with high magnification (of the order of 18) and makes it possible, better than a strong magnifying glass or a jeweller's eyepiece (instruments which are too short and difficult to fit in the eye) and without having recourse to a binocular device, to observe objects which are substantially invisible to the naked eye and to fix a precise point to be observed (e.g. an insect larvae in agriculture, for identifying it, studying its stage of development, ect. . . . and determining the best treatment times).

According to the invention, the device comprises an elongate housing, open at its ends, on one end of which is fixed an eyepiece and comprising, inside its other end, two biconvex lenses which are of the same power and which are disposed in parallel grooves formed inside the support.

In a particular arrangement, the distance A between the two biconvex lenses is defined by the equality $A = (f1)/2$ (f1 representing the focal distance of the first lens), this distance A being less than or equal to the diameter of said first lens. The relation between the distance A and the distance B separating the second lens and the eyepiece will then be such that $$3A \leq B \leq 4A.$$

The monocular device may be formed (except for the optical parts) from a plastic material or a light material, and may have a cylindrical shape or any other suitable shape.

To facilitate cleaning, the eyepiece of the monocular device may advantageously be provided with a plain glass.

BRIEF DESCRIPTION OF THE DRAWINGS

The presente invention will be better understood from the following description of a preferred embodiment, with reference to the accompanying schematic drawings in which.

DESCRIPTION OF THE PREFERRED EMBODIMENT

Figure 1:
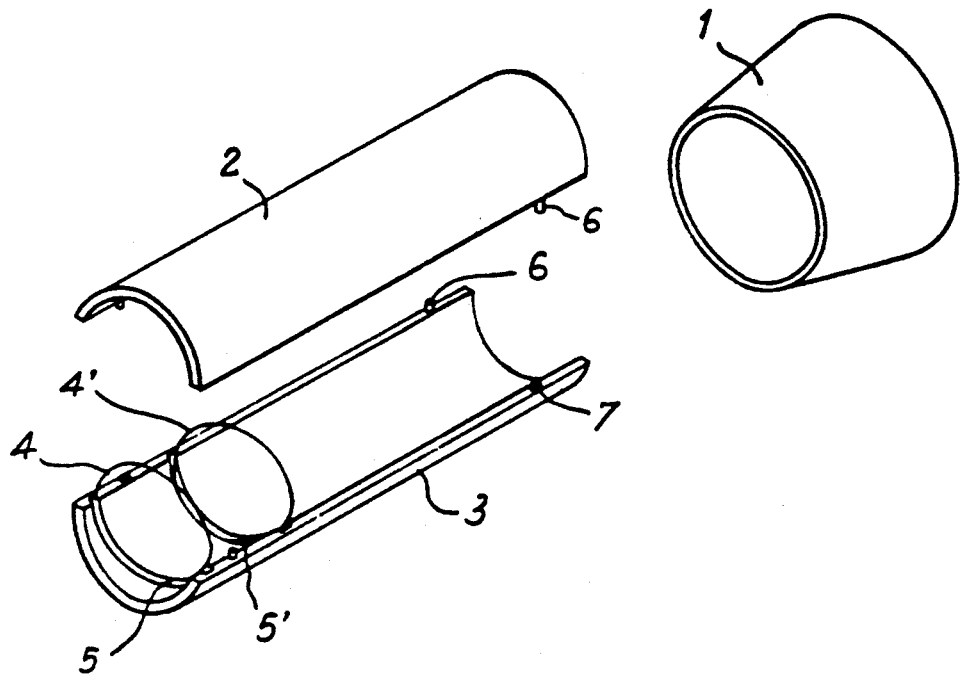
FIG. 1 is an exploded view of the main component elements of a portable monocular device in accordance with the invention.
Figure 2:
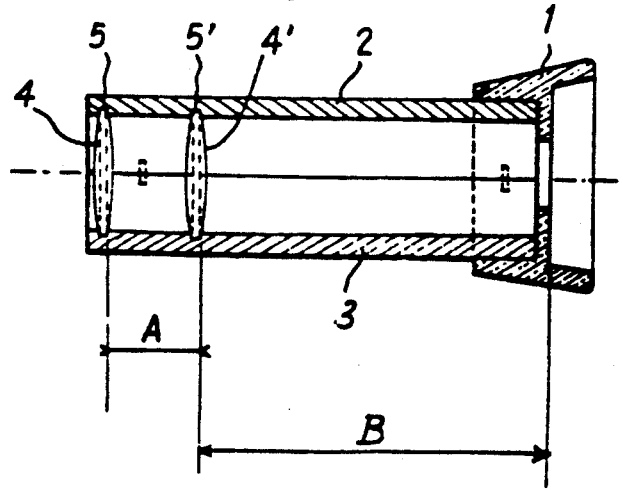
FIG. 2 is a longitudinal section of the assembled device through line II—II of FIG. 3.
Figure 3:
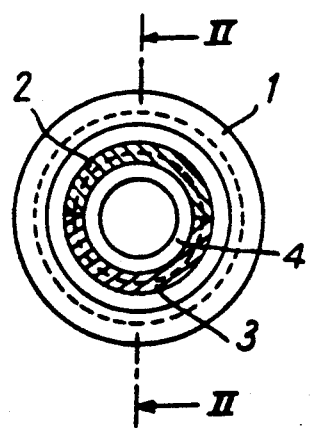
FIG. 3 is a cross sectional view of the device.

The monocular device shown comprises a cylindrical shaped body made from a plastic material and formed of two parts 2,3 with spherical grooves 5,5' disposed, at one end, on its internal face. In a typical example, the cylindrical body has a length of 75 mm, an inner diameter of 17 mm and an outer diameter of 22 mm. The first groove 5 is situated at 2 mm from the aperture of the cylindrical body and the second groove 5' is at a distance $A = 15$ mm from the first groove. Two biconvex lenses 4, 4', each of a power of 33 diopters; with a magnification of 9 and a diameter of 18 mm, are inserted respectively in grooves 5,5'. Opposite the lenses 4,4' an eyepiece 1, provided with a plain glass, is fitted on the cylindrical body so that a distance $B = 45$ mm separates the plain glass of the eyepiece 1 from lens 4'. The distance $A = 15$ mm has been chosen to be half the focal distance f of lens 4 and so as not to be greater than the diameter of this lens.

The monocular device has the feature of being very readily dismantled. For this it is sufficient to remove the eyepiece 1 from the cylindrical body formed of elements 2,3. These two elements are fixed together by a male-female closure system 6,7 (any other appropriate system of the same kind could be used).

In order to be able to grip it better, the body of the monocular device may be provided with grooves on its external surface.

It will be understood that the above description has been given by way of example, without any limitative character, and constructional additions or modifications could be made without departing from the scope of the present invention.

I claim:

1. Portable monocular device for close-up observation with high magnification of objects substantially invisible to the naked eye, which comprises:

an elongate body;

an eyepiece fixed on one end of said elongate body;

a first biconvex lens disposed in a groove formed inside the elongate body at the other end thereof;

a second biconvex lens of the same power as said first biconvex lens and constituting therewith a lens system, the second biconvex lens being disposed in another groove formed inside the elongate body, said second biconvex lens being at a distance A of the first biconvex lens and at a distance B of the eyepiece;

the distance A being equal to half the focal distance of the first lens and being less than or equal to a diameter of this first lens, said distances A and B being in a relationship such that $3A \leq B \leq 4A$.

2. Device according to claim 1 wherein the elongate body has the form of a cylinder and is made in two parts adapted to be assembled together.

3. Device according to claim 1 wherein for a commercial magnification of about 13, the elongate body is cylindrical and has a length of approximately 75 mm, an inner diameter of 17 mm and an outer diameter of 22 mm, said two biconvex lenses each having a power of 33 diopters, a magnification of 9 and a diameter of 18 mm, the distance A between these lenses being approximately 15 mm and the distance B between the second lens and a plain glass portion of the eyepiece being approximately 45 mm.

4. Device according to claim 1 wherein said elongate body is made from a light plastic material.

* * * * *